Sept. 5, 1961  E. L. RICKETTS  2,998,624
EXTRUSION ORIFICE END BLOCK
Filed Oct. 16, 1959  2 Sheets-Sheet 1

INVENTOR.
EZRA L. RICKETTS
BY
McMorrow, Berman & Davidson
ATTORNEYS

Sept. 5, 1961  E. L. RICKETTS  2,998,624
EXTRUSION ORIFICE END BLOCK
Filed Oct. 16, 1959  2 Sheets-Sheet 2

INVENTOR.
EZRA L. RICKETTS
BY
McMorrow, Berman & Davidson
ATTORNEYS 2,998,624
EXTRUSION ORIFICE END BLOCK
Ezra L. Ricketts, Rte. 1, Box 163, Laurelville, Ohio
Filed Oct. 16, 1959, Ser. No. 847,009
1 Claim. (Cl. 18—12)

The present invention relates to extrusion apparatus of the type for producing film, foils, sheets and like products from film-forming compositions generally and in particular to an end block for the extrusion orifice of such an apparatus.

Presently in use are film extrusion devices employing a pair of lip members spaced from each other so as to provide an extrusion orifice. The lip members are elongated and adjustable over their lengths toward and away from each other. Customarily, an end block engages each of the complemental ends of the lip members and closes the adjacent ends of the orifice. In the past, considerable difficulty has been experienced in preventing the flow of the film-forming compositions between the end blocks and the adjacent ends of the lip members due to the fact that the lip members are adjustable along their lengths to vary the width of the orifice and this results in shifting of the end faces of the lip members out of coplanar alignment. During the film-forming operation, the lip members remain submerged in the coagulating or regenerating liquid. The adjustment of the end blocks on the lip members in order to accommodate an adjusted position of the lip members relative to each other invariably leaves a crack between the end block and one or other of the lip members through which will seep a portion of the film-forming composition.

An object of the present invention is to provide an extrusion orifice end block which minimizes to an optimum extent the seepage of the film-forming composition from between the end block and the adjacent ends of the lip members.

Another object of the present invention is to provide an end block construction which permits adjustment of the end blocks on the complemental ends of the lip members after the lip mebers have been adjusted to their orifice-defining positions and which may be accomplished with ease and facility.

A further object of the present invention is to provide an orifice end block for a film-extrusion apparatus which is simple in structure, one sturdily constructed and having long-life characteristics, and one which is economically feasible.

These and other objects and advantages of the present invention will be fully apparent from the following description when taken in conjunction with the annexed drawings, in which.

Figure 1:
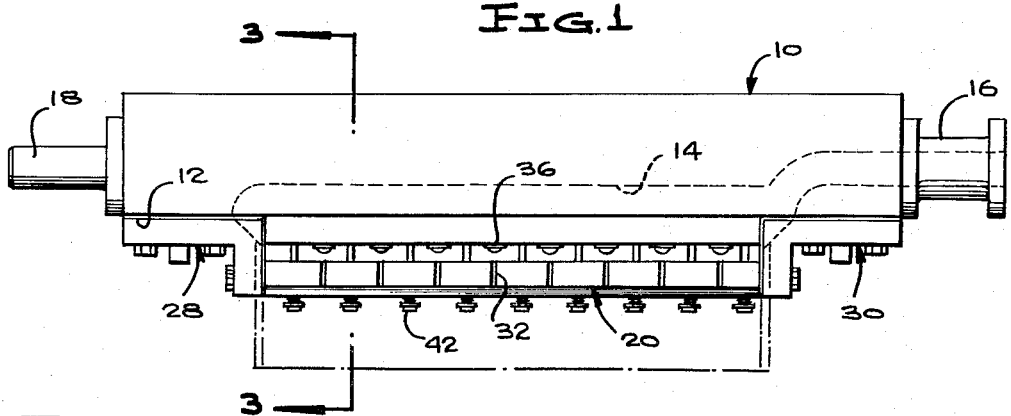
FIGURE 1 is a side elevational view of the body member of an extrusion apparatus showing the end blocks of the present invention secured thereto.

Referring in greater detail to the drawings in which like numerals indicate like parts throughout the several views, the reference numeral 10 designates generally a casting or body member having a flat bottom 12 provided with a distribution chamber 14. One end of the chamber 14 is connected by a conduit 16 to a source of film-forming composition in fluid or semifluid condition.

A tubular support 18 projects from the body member 10 at the end remote from the conduit 16.

A pair of lip members 20 and 22 are arranged in confronting face to face relation and are positioned beneath and longitudinally of the flat bottom 12 of the body member 10 and abuttingly engage the bottom 12. The confronting faces or lips 24 and 26 on the lip members 20 and 22, respectively, are spaced from each other and form an extrusion orifice through which the film-forming material or composition is forced into a body of coagulating or regenerating liquid.

Figure 2:
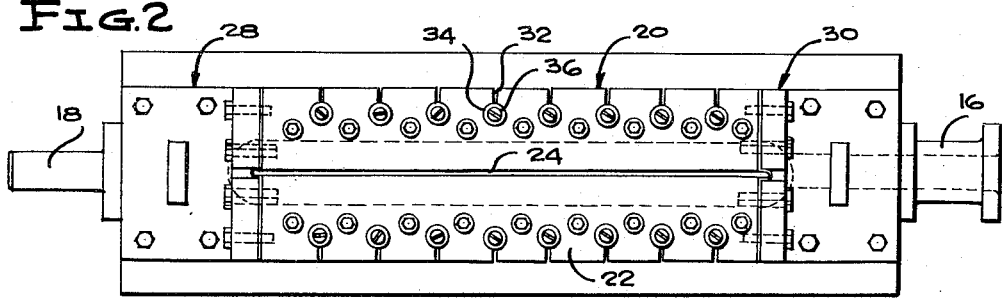
FIGURE 2 is a bottom plan view of the assembly shown in FIGURE 1.
Figure 3:
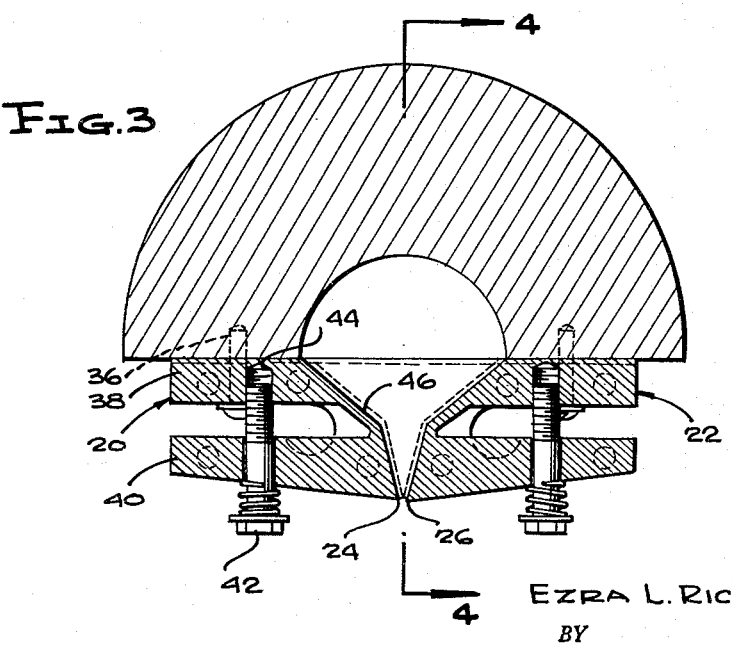
FIGURE 3 is a view on an enlarged scale, taken on the line 3—3 of FIGURE 1.

The construction of the lip members 20 and 22 is conventional and is herewith described in order that the function of the end blocks, here designated by the numerals 28 and 30, be understood. The lip members 20 and 22 are identical and, with reference to the lip member 20 in FIGURES 1 and 2, it will be seen that a plurality of slots 32 are arranged in spaced relation and extend inwardly from the side edge of the lip member 20 remote from the lip 24. Each slot 32 terminates in a hole 34 of a size to admit therethrough the end of a screwdriver for tightening and loosening the adjacent set screw 36. The set screws 36 secure the upper flange 38 of the lip member 20 to the flat bottom 12 of the body member 10.

Figure 4:
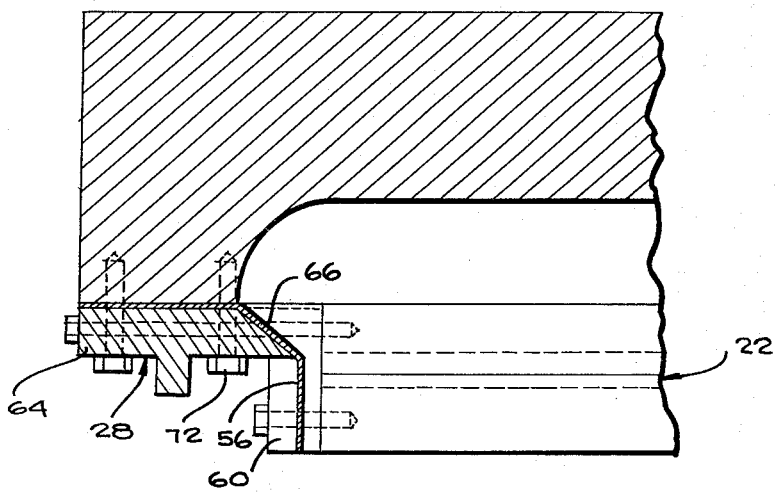
FIGURE 4 is a view taken on the line 4—4 of FIGURE 3.
Figure 5:
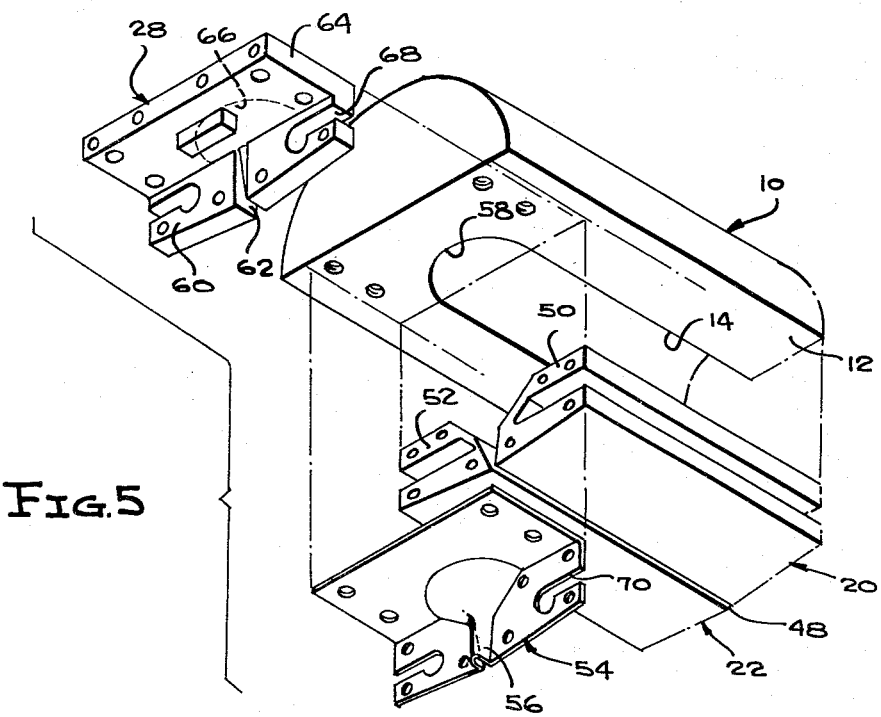
FIGURE 5 is an exploded isometric view of one end of the body member shown in FIGURES 1 through 4, with the end block and gasket of the present invention shown in detached condition.

Intermediate the slots 32 in the flange 40 of a lip member 20 are adjusting bolts 42 having the free ends of their shanks threaded in bores 44 provided in the adjacent part of the flange 38. Due to the relative thinnerss of the web 46 which connects the flanges 38 and 40 together, the adjustment of the bolts 42 effects the movement of the flanges 38 and 40 away from each other and toward each other to shift the lip 24 toward and away from the lip 26 throughout the length of the lip member 20. It is to be understood that the lip member 22 is similarly provided. With reference to FIGURES 4 and 5, this adjustment of the lip members 20 and 22 toward and away from each other for the purpose of varying the width of the extrusion orifice, designated by the numeral 48 in FIGURE 5, results in distortion of the lip members 20 and 22 relative to each other so that their end faces 50 and 52, respectively, are shifted out of coplanar alignment.

The construction of the end blocks 28 and 30 of the present invention will be described with reference to the end block 28, as the end blocks 28 and 30 are identical.

The end block 28 is used in conjunction with a gasket member 54 fabricated of a suitable material such as aluminum or stainless steel. The gasket member 54 is conformably shaped to extend over one of the complemental ends of the lip members 20 and 22, over the adjacent end of the orifice 48, and over the adjacent end portion of the body member bottom 12.

The gasket member 54 is L-shaped with the longer leg adapted to be secured to the projecting end portion of the body member bottom 12 and the short leg adapted to be secured to the end faces 50 and 52 of the lip members 20 and 22. The gasket member 54 is provided with a runway 56 opening toward the orifice 48 and having the end adjacent the bottom 12 conformably shaped to the semicircular end 58 of the distribution chamber 14 and body member 10.

The end block 28 is also of L-shaped configuration having the short leg 60 provided with a slot 62 extending from the junction of the short leg 60 with the long leg 64 to the free end of the short leg 60.

The end block 28 is of a shape and size to conformably set over the gasket 54. The face of the long leg 64 is provided with a recess, shown in dotted lines in FIGURE 5 and designated by the numeral 66, which is conformably shaped to the upper end portion of the runway 56 of the gasket member 54. The lower end of the recess 66 is in communication with the upper end of the slot 62.

The ends of the short leg 60 are cut inwardly as at 68 to provide slots which serve to make resilient the portions of the short leg 60 on each side thereof. Similarly, the short leg of the gasket member 54 is provided, at each end, with other slots 70, as shown most clearly in FIGURE 5.

In use, securing elements or bolts 72 are employed to secure each of the end blocks 28 and 30 to the adjacent complemental one ends of the lip members 20 and 22 and to the end portions of the flat bottom 12 of the body member 10, with the gasket member 54 interposed therebetween and with the bolts 72 extending through the end blocks 28 and 30, through the gasket members 54, and into the adjacent portions of the lip members 20 and 22 and the bottom 12 of the body member 10.

When each of the blocks 28 and 30 is in position attached to the complemental one ends of the lip members 20 and 22 and to the bottom 12, the slot 62 in the respective end block 28 or 30 is in registry with the adjacent end of the extrusion orifice 48 and the runway 56 of the adjacent gasket member 54 projects into and is embracingly received in the adjacent slot 62. The face of the runway 56 which is in registry with and faces the orifice 48 serves as an extension of the orifice 48 and may be varied in width according to the adjustment of the lip members 20 and 22 toward and away from each other. The gasket member 54 is of a thickness that the runway 56 may be deformed by hand, before assembly of the end block 28 or 30 on the lip members 20 and 22, so that as a film is formed during the extruding operation, a bead is formed on the edge of the sheet, or the gasket member 54 may be deformed so that no bead is formed on the sheet edge, as desired.

What is claimed is:

In a film extrusion apparatus, an upstanding body member having a flat bottom, a pair of lip members arranged in confronting face to face relation positioned beneath and longitudinally of said flat bottom and abuttingly engaging said bottom with each of the complemental ends of said lip members being adjacent to and spaced inwardly of the adjacent end portion of said body member bottom, and means connecting said lip members to said body member for movement toward and away from each other to provide a longitudinally extending open ended extrusion orifice, the improvement consisting in a gasket member conformably shaped to extend over one of the complemental ends of said lip members, the adjacent end of said extrusion orifice, and the adjacent end portion of said body member bottom, said gasket member being provided with a runway, said gasket member being positioned so as to abuttingly engage one of the complemental ends of said lip members and the adjacent end portion of said body member bottom with said runway facing and in registry with said extrusion orifice, and anchoring means embodying an L-shaped block having the short leg thereof provided with a slot extending from the junction of said short leg with the long leg of said block to the free end of said short leg, said block being positioned so that the short leg extends over said one complemental ends of said lip members with said slot embracingly receiving the runway in said gasket member and with said long leg extending over the adjacent end portion of said body member bottom, and securing elements extending through said end block, gasket, and into said lip members and the end portion of said body member bottom.

References Cited in the file of this patent

UNITED STATES PATENTS

| | | |
|---|---|---|
| 2,387,718 | Coleman | Oct. 30, 1945 |
| 2,479,804 | Bailey et al. | Aug. 23, 1949 |
| 2,765,492 | Velvel | Oct. 9, 1956 |
| 2,923,971 | Nelson | Feb. 9, 1960 |